United States Patent Office 3,109,871
Patented Nov. 5, 1963

3,109,871
PRODUCTION AND CURING OF POLYFUNC-
TIONAL TERMINALLY REACTIVE POLYMERS
Robert P. Zelinski, Henry L. Hsieh, and Charles W.
Strobel, Bartlesville, Okla., assignors to Phillips Petroleum Company, a corporation of Delaware
No Drawing. Filed Dec. 27, 1960, Ser. No. 78,366
17 Claims. (Cl. 260—85.1)

This invention relates to a method of preparing and curing polyfunctional terminally reactive polymers and to the resulting products. In another aspect it relates to polymers containing terminally positioned reactive groups of two varieties which can be reacted with two entirely different types of coupling and/or curing agents.

It has been disclosed in copending application Serial No. 772,167 of Uraneck, Short, Hsieh and Zelinzki, filed November 6, 1958, that highly useful polymeric products can be obtained by polymerizing vinylidene-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal substituents on the polymer molecule enables substantially more effective cures since all of the molecules can be tied into the cross-linked structure. Also by simple coupling arrangements alone or with auxiliary curing, liquid polymers can be readily converted into solids and soft tacky rubber can be made quite rigid. The term "telechelic" has been coined to define these terminally reactive polymers. As used in this specification, telechelic polymers means polymers of vinylidene-containing monomers which contain a reactive group upon each end of the polymer molecule. By employing a suitable initiator, polymers can be prepared which contain reactive groups on only one end of the polymer molecule, in which case the term "semi-telechelic" is used to denote these polymers.

According to our invention a polymer is provided which contains reactive end groups of two types on at least one end of the polymer molecule. These terminally reactive polymers contain both hydroxy and tertiary amino groups which can be coupled and/or cross linked by treatment with appropriate reagents. For example, polyisocyanates react with the hydroxy groups and quaternizing agents containing 2 or more reactive halogen atoms react with the tertiary amino groups. The polyfunctional terminally reactive polymers are prepared according to our invention by reacting a polymer of a vinylidene-containing monomer, which polymer contains at least 1 terminal alkali metal atom per molecule, with either an N,N-disubstituted amino aldehyde or an N,N-disubstituted amino ketone. We have discovered that these multifunctional telechelic or semitelechelic polymers are useful not only in their ability to be cured by two different types of curing or coupling agents but also the presence of the tertiary amino group activates the cure of a polyisocyanate with the hydroxy end groups, thereby greatly improving the degree of cure possible with this type of reaction.

It is an object of our invention to provide a method of preparing polymers having polyfunctional terminally reactive groups. Another object of our invention is to provide a polymer which can be cured by two different types of coupling or curing agents reactive with hydroxy or tertiary amino groups. Another object is to provide a hydroxytelechelic polymer which has enhanced reactivity between the hydroxy groups of the polymer and polyisocyanate curatives. Other objects and advantages and features of our invention will be apparent to those skilled in the art from the following disclosure.

The polymers which contain terminally reactive alkali metal atoms can be prepared from a wide variety of monomers. The preferred monomers are the conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of my invention and preferred monomers are butadiene, isoprene and piperylene.

In addition to the conjugated dienes I can practice my invention with other monomers containing a $CH_2=C<$ group such as the vinyl-substituted aromatic compounds. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include: 3-methylstyrene (3-vinyltoluene), 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tri-tert-butylstyrene, 2,3,4,5-tetramethylstyrene, 4-(4-phenyl-n-butyl)styrene, 3-(4-n-hexylphenyl)styrene, 4-methoxystyrene, 3,5-diphenoxystyrene, 3-decoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinylnaphthalene, 2,4-diisopropyl-1-vinylnaphthalene, 3,6-di-p-tolyl-1-vinylnaphthalene, 6-cyclohexyl-1-vinylnaphthalene, 4,5-diethyl-8-octyl-1-vinylnaphthalene, 3,4,5,6 - tetramethyl - 1 - vinylnaphthalene, 3,6 - di - n - hexyl - 1-vinylnaphthalene, 8-phenyl-1-vinylnaphthalene, 5-(2,4, 6 - trimethylphenyl) - 1 - vinylnaphthalene, 3,6 - diethyl - 2-vinylnaphthalene, 7-dodecyl-2-vinylnaphthalene, 4-n-propyl - 5 - n - butyl - 2 - vinylnaphthalene, 6 - benzyl - 2 - vinylnaphthalene, 3 - methyl - 5,6 - diethyl - 8 - n - propyl-2-vinylnaphthalene, 4-o-tolyl-2-vinylnaphthalene, 5-(3-phenyl-n-propyl)-2-vinylnaphthalene, 4-methoxy-1-vinylnaphthalene, 6-phenoxy-1-vinylnaphthalene, 3,6-dimethylamino-1-vinylnaphthalene, 7-dihexoxy-2-vinylnaphthalene and the like. These vinyl-substituted aromatic compounds can be used to form copolymers including block copolymers with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form copolymers. These polar monomers can be employed to form block copolymers with conjugated dienes.

When preparing these block copolymers the polar monomer is introduced after the non-polar monomers have polymerized. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include: 2-vinylpyridine, 4-vinylpyridine, 3,5-diethyl - 4 - vinylpyridine, 5-methyl-2-vinylpyridine, 5-n-octyl-2-vinylpyridine, 3-n-dodecyl-2-vinylpyridine, 3,5-di-n-hexyl-4-vinylpyridine, 5-cyclohexyl-2-vinylpyridine, 4-phenyl - 2-vinylpyridine, 3,5-di-tert-butyl-2-vinylpyridine, 3 - benzyl-4-vinylpyridine, 6-methoxy-2-vinylpyridine, 4-phenoxy - 2-vinylpyridine, 4-dimethylamino-2-vinylpyridine, 3,5-dimethyl-4-diamylamino-2-vinylpyridine, 2-vinylquinoline, 4-vinylquinoline, 2-tert-butyl-4-vinylquinoline, 3 - methyl-4-vinylquinoline, 3-cyclohexyl-4-vinylquinoline, 3-methyl-4-ethoxy-2-vinylquinoline, 1-vinylisoquinoline, 3-vinylisoquinoline, 4-tert-dodecyl-1-vinylisoquinoline, 3-dimethylamino - 3-vinylisoquinoline, 4-benzyl-3-vinylisoquinoline, 4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide and the like. Vinylfuran and N-vinylcarbazole can also be used.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally at at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 1 to 4.

The organo alkali metal initiators employed for preparing the polymers used in my invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 1 to 4. The R in the formula generally contains from 1 to 20 carbon atoms although it is within the scope of the invention to use higher molecular weight compounds. By far the best results are obtained with organolithium compounds which give very high conversions to the terminally reactive polymer. Lithium is, therefore, the preferred alkali metal for the polymerization initiator. Examples of mono- and polyalkali metal substituted hydrocarbons which can be employed for the polymerization initiator include methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,6-dilithiohexane, 1,10-dilithiodecane 1,15-dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1-1-diphenylethane, 1,2-disodio-1,2,3-triphenylpropane, 1,2-dilithio-1,2-diphenylethane, 1,2-dipotassiotriphenylethane, 1,2-dilithiotetraphenylethane, 1,2 - dilithio-1-phenyl-1-naphthylethane, 1,2-dilithio-1,2-dinaphthylethane, 1,2-disodio-1,1-diphenyl-2-naphthylethane, 1,2-dilithiotrinaphthyiethane, 1,4-dilithiocyclohexane, 2,4-disodioethylcyclohexane, 3,5-dipotassio-n-butylcyclohexane, 1,3,5-trilithiocyclohexane, 1 - lithio-4-(2-lithiomethylphenyl)butane, 1,2-dipotassio-3-phenylpropane, 1,2-di(lithiobutyl)benzene, 1,3-dilithio-4-ethylbenzene, 1,4-dirubidiobutane, 1,8-dicesiooctane, 1,5,12-trilithiododecane, 1,4,7-trisodioheptane, 1,4-di(1,2-dilithio - 2-phenylethyl)benzene, 1,2,7,8-tetrasodionaphthalene, 1,4,7,10-tetrapotassiodecane, 1,5-dilithio-3-pentyne, 1,8 - disodio-5-octyne, 1,7-dipotassio-4-heptyne, 1,10-dicesio-4-decyne, 1,11-dirubidio-5-hendecyne, 1,2-disodio-1,2-diphenylethane, dilithiophenanthrene, 1,2-dilithio-triphenylethane, dilithiomethane, 1,4 - dilithio-1,1,4,4-tetraphenylbutane, 1,4-dilithio-1,4-diphenyl-1,4-dinaphthylbutane and the like.

Certain specific initiators give better results than others and are preferred in carrying out preparation of the terminally reactive polymers. Lithium adducts of naphthalene, methylnaphthalenes, and anthracene give very good results. A preferred initiator is 1,2-dilithio-1,2-diphenylethane (lithium-stilbene adduct). An initiator which is preferred for the formation of semitelechelic polymers is n-butyllithium. Other preferred initiators for the formation of telechelic polymers are the dilithium adducts of 2,3-dialkyl-1, 3-butadienes, e.g., 2,3-dimethyl-1,3-butadiene, and especially the dilithium adducts of isoprene and 1,3-butadiene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1,000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 gram of monomers. It is preferred that the polymerization be carried out in the presence of a suitable diluent which is predominantly hydrocarbon, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatic containing from 4 to 10 carbon atoms per molecule. It should be understood that relatively small amounts of other materials can be present, such as the ethers in which the initiator was dissolved, or a polar compound which is charged to encourage random copolymerization. As stated previously, the organolithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures.

The polymer chains resulting from the above described process are terminated with one or more alkali metal atoms, preferably lithium atoms, depending upon the initiator employed. Without terminating the polymerization mixture or treating it in any way to remove the alkali metal atoms from the polymer, the polymer is then treated with an N,N-disubstituted amino aldehyde or ketone. This reaction can be illustrated with 4-dimethylaminobenzaldehyde as follows:

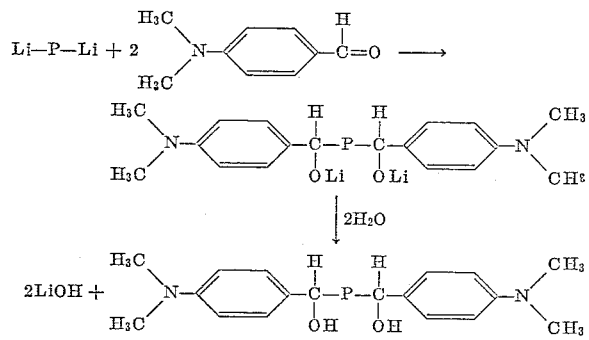

The above equations illustrate the reaction which occurs when polymers are used which are prepared using organo dilithium initiators. When an organo monolithium initiator is employed, treating the polymer with an N,N-disubstituted amino aldehyde or ketone yields a product containing only one polyfunctional terminal group.

The aldehydes and ketones from which the N,N-disubstituted amino compounds are derived are those which contain from 2 to 20 carbon atoms per molecule and from 1 to 4 N,N-substituted amino groups can be present. The nitrogen of the amino groups contains substituents such as alkyl, cycloalkyl, aryl, aralkyl, and alkaryl groups and these substituents can contain from 1 to 12 carbon atoms per substituent group. Unsubstituted amino aldehydes or ketones should not be used. Examples of N,N-disubstituted amino aldehydes or ketones which are useful in our invention include: 3-dimethylaminopropionaldehyde, 3-diethylaminopropionaldehyde, 4-dimethylaminobenzaldehyde, dimethylaminopivaladehyde (2,2-dimethyl-3-dimethylaminopropionaldehyde), 4-dimethylaminoacetophenone, 4,4-bis(dimethylamino) benzophenone, 3-diethylaminobenzophenone, 1,5-bis(di-n-propylamino) - 3 - pentanone, 2-dimethylaminoacetaldehyde, 3,5-bis(dioctylamino)-n-valeraldehyde, 5-dodecylamino-n-heptaldehyde, 18-di-tert-butylaminostearaldehyde, 3-dicyclohexylaminopropionaldehyde, 4-di(4 - methylcyclohexyl)-n-butyraldehyde, 6-diphenylaminocaproaldehyde, 4,8,12-tris(dimethylamino)lauraldehyde, 7-dibenzylaminoheptaldehyde, 8-di(4 - tolylamino)capryaldehyde, 3,5 - bis(dihexylamino)-benzaldehyde, 2,4,6-tris(didecylamino)benzaldehyde, 4-dicyclopentylaminobenzaldehyde, 4,5-bis(dipentylamino)-1-naphthaldehyde, 1,3-bis(diheptylamino)-2-propanone, 1,7-bis(methylethylamino) - 4 - heptanone, 1,10-bis(diphenylamino)-5-dodecanone, 1,5,15,20-tetra(diethylamino)-10-eicosanone and 3,3',5,5'-tetra(dinonylamino)benzophenone.

The amount of N,N-disubstituted amino aldehyde or ketone employed is at least that which will react with all of the alkali metal atoms in the polymer and it is preferred that an excess be used. The quantity employed is generally in the range of 1 to 25 mols of disubstituted amino compound per gram atom of alkali metal present in the polymer with 1 to 10 mols per gram atom of alkali metal being preferred. The temperature employed for the reaction of the disubstituted amino compound with the alkali metal containing polymer can vary over a broad range and is frequently the same as that used for preparing the polymer. Temperatures in the range of 0 to 150° C. are suitable although higher or lower temperatures can be employed.

Since the products which are prepared as described above in accordance with our invention contain terminal groups in which both hydroxy and tertiary amino groups are present, these polymers can be coupled and/or cured (crosslinked) with two types of reagents or mixtures of these reagents. A wide variety of polymeric compositions can thereby be obtained. The tertiary amino group is also of advantage in the curing reaction since it has an activating effect on the cure involving the hydroxy groups.

Preferred coupling or crosslinking agents for reaction with the hydroxy groups of the polymers are polyisocyanates. By "polisocyanate" is meant a compound containing two or more NCO groups. Where a polymer is prepared with a mono-alkali metal initiator and contains only 1 terminal hydroxy group the polyisocyanate produces coupling. Otherwise coupling, and/or crosslinking can be effected by controlling the amount of polyisocyanate employed. Examples of polyisocyanates which are applicable include compounds containing two or more —N=C=O groups. Representative polyisocyanates are: benzene-1,3-diisocyanate, benzene-1,4-diisocyanate, hexane-1,6-diisocyanate, toluene-2,4-diisocyanate (tolylene-2,4-diisocyanate), toluene-3,4-diisocyanate, diphenylmethane-4,4'-diisocyanate, naphthalene-1,5-diisocyanate, diphenyl-4,4'-diisocyanate, diphenyl - 3,3' - dimethyl-4,4'-diisocyanate, diphenyl-3,3'-dimethoxy-4,4'-diisocyanate, 2,2'-diisocyanate diethylether, 3-(diethylamino)-pentane-1,5-diisocyanate, pentane-1,5-diisocyanate, butane-1,4-diisocyanate, octane-1,8-diisocyanate, ethane diisocyanate, propane-1,2-diisocyanate, cyclohex-4-ene-1,2-diisocyanate, xylylene - 1,4 - diisocyanate, benzene - 1,2,4-triisocyanate, naphthalene-1,3,5,7-tetraisocyanate, triphenylmethane triisocyanate, naphthalene-1,3,7-triisocyanate, and the like.

A suitable commercially available polyaryl polyisocyanate is PAPI 1, a product of Corwin Chemical Company. This material has an average of 3 isocyanate groups per molecule and an average molecular weight of about 380. Its general formula is:

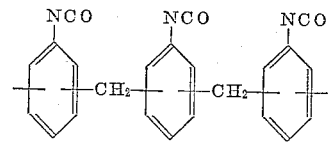

The polyisocyanates can be aliphatic, cycloaliphatic or aromatic compounds. Preferably the polyisocyanates are represented by the general formula $R(NCO)_m$ wherein R is a polyvalent organic radical containing from 2 to 30 carbon atoms and $m$ is 2, 3, or 4. R can be aliphatic, cycloaliphatic or aromatic. Also we prefer that the organic radical be essentially hydrocarbon in character although the presence of unreactive groups containing elements other than carbon and hydrogen is permissible.

Other coupling and/or curing agents which will react with the hydroxy groups can be used, for example, anhydrides such as maleic anhydride and pyromellitic dianhydride, di- and tricarboxy acids and the corresponding acid chlorides such as maleic acid, pyromellitic acid, terephthalic acid, trimellitic acid, phthaloyl chloride, terephthalyl chloride, and fumaryl chloride, chloromethylphosphonic dichloride, and the like. Polycarboxy acids can be used and the term "polycarboxy" is employed here to indicate compounds which contain two or more carboxy groups.

The polymers of this invention can also be coupled and/or crosslinked with polyhalogen containing compounds which undergo a quaternization reaction with the tertiary amino groups present on at least one end of the polymer molecule. These polyhalogen-containing compounds are the type which are normally employed as quaternizing agents for heterocyclic nitrogen-containing compounds and their polymers. The polyhalogen-containing compounds should not contain more than 3 halogen atoms attached to a single carbon atom. Examples of suitable compounds of this nature are benzotrichloride, bis(trichloromethyl)benzene, 1,10-dibromodecane, $\alpha,\alpha'$-dichloroparaxylene, hexachloroparaxylene, 1,2-dibromoethane, 1,2-diiodoethane, 1,2-dichloropropane, 1,2-dibromobutane, 1,2-dibromooctane, 1,3-diiodopropane, 1,4-dibromobutane, 1,3-diiodohexane, 1,3,5-trichloropentane, 1,3,4,6-tetrabromohexane, 1,2,7,8-tetraiodooctane, bromoform, iodoform, hexachlorocyclopentadiene, organophosphonic dihalides and organothiophosphnic dihalides containing up to 20 carbon atoms per molecule such as methylphosphonic dichloride, chloromethyl phosphonic dichloride, 2-bromoethylphosphonic dichloride, dodecylphosphonic dichloride, methylthiophosphonic dichloride, 3-methylphenylthiophosphonic dichloride, bis(chloromethyl) ether, bis(1-bromoethyl) ether, 1,3-dichloro-2-propanone, 1,5-dichloro-2,4-pentanedione, 1,4-bis(chloromethyl)benzene, 1,4-dichloro-2-butene, bis(bromoethyl)ether, methyl dichloromethyl ether, bis(1-fluoropropyl) ether, bis(iodomethyl) ether, chloromethyl 1-chloropropyl ether, bis(1-iodamyl) ether, bis(1-chlorodecyl)ether, hexyl 1,1-dichloroheptyl ether, 1-chloro-n-butyl 1,1-dichloro-n-butyl ether, bis(1,1-dibromodecyl) ether, 1,1-difluoroethyl 1-fluoroheptyl ether, bis[chloro(ethoxy)methyl] ether, bis[1-bromo(2-propyl)ethyl] ether, difluoromethyl 1-fluoro(3-ethoxy)propyl ether, bis-[chloro(vinyloxy)methyl] ether, bis[1-iodo-(4-vinyloxy)-n-butyl] ether, 1-bromo(2-vinyloxy)ethyl 1,1-dibromopropyl ether, bis[1-chloro(5-vinyloxy)octyl] ether, bis[chloro(N,N - dimethylamino)methyl] ether, dibromomethyl 1-bromo-4-(N,N-dimethylamino)n-butyl ether, bis[1-iodo-6-(N,N-diethylamino)hexyl] ether, 2,2-dibromo-3-decanone, 3,5,5-trichloro-4-octanone, 2,4-dibromo-3-pentanone, 1-chloromethyl-4-(1-chloro-n-propyl)benzene, 1,3,5-tri(bromoethyl)benzene, 1,4-dichloro-2-hexene, 4,4-di-chloro-2-heptene, 1,1-dibromo-4-chloro-2-pentene and 2,5,6,9-tetrachloro-3,7-decadiene, and the like.

It is preferred that at least a stoichiometric amount of each type of coupling or curing agent be used and a large excess is satisfactory. For best results the amount is generally in the range of stoichiometric to about 30 percent excess. The curing temperatures can vary over a broad range depending upon the choice of coupling or crosslinking agent. Temperatures in the range of 150 to 350° F. are applicable.

When compounding the polymers of this invention, carbon black and various types of mineral fillers can be used. The invention provides a method whereby liquid polymers can be coupled or crosslinked with either of two types of curatives individually or sequentially or a mixture of curatives to produce semi-solid and solid products. The end products are useful in adhesive compositions, potting compounds, for making molded objects and as binders for solid materials. Rubber having good properties can be obtained by using a combination of the curatives which will produce crosslinking along the polymer chain as well as at the end of the polymer molecule. For example, dicumyl peroxide or similar organic peroxides can be used as an auxiliary curative in combination with those agents described as reactive with the functional groups at the ends of the polymer molecules.

The advantages of our invention will be more apparent from the following examples. The specific materials and conditions used in these examples are presented as being typical and should not be construed to limit our invention unduly.

*Example I*

Butadiene was polymerized in accordance with the following recipe:

| | |
|---|---|
| Cyclohexane, parts by weight | 780 |
| 1,3-butadiene, parts by weight | 100 |
| 1,2-dilithio-1,2-diphenylethane, moles | 20 |
| Temperature, ° C. | 50 |
| Time, hours | 0.5 |

Cyclohexane was charged first, the reactor was purged with nitrogen, 1,2-dilithio-1,2-diphenylethane was added, and then the butadiene. After a polymerization period of 30 minutes, 40 millimoles of 4-dimethylaminobenzaldehyde was added as a 0.5 molar solution in toluene. The mixture was stirred and the temperature was maintained at 50° C. Another 40-millimole portion of 4-dimethylaminobenzaldehyde was added after one hour and the mixture again stirred and allowed to react for an hour. The reaction mixture was then washed with three 100 milliliter portions of water, coagulated with isopropanol, and the liquid polymer was separated and dried overnight. Titration of a benzene solution of the product with perchloric acid in glacial acetic acid showed that 42 millimoles of base were present per 100 grams of polymer.

The dimethylaminobenzaldehyde-treated polymer which contained both hydroxy and tert-amino terminal groups was cured with tolylene-2,4-diisocyanate alone (a curative for a hydroxy group) and with a mixture of tolylene-2,4-diisocyanate and $\alpha,\alpha'$-dichloro-p-xylene (the latter is a quaternizing agent for the tert-amino groups), using one equivalent of reactant per end group with which it would react. One run was made in which the polymer was heated at the curing temperature but no curative was added. The following results were obtained:

| Run No. | Curing Agent | Curing Temp., °F. | Time, Days | Inh. Vis. | Gel, Percent |
|---|---|---|---|---|---|
| 1 | None | 160 | 4 | 0.29 | 0 |
| 2 | tolylene-2,4-diisocyanate | 160 | 3 | [1] 0.33 | 23 |
| 3 | tolylene-2,4-diisocyanate+ $\alpha,\alpha'$-dichloro-p-xylene. | 160 | 3 | [1] 0.26 | 44 |

[1] On soluble portion.

Cross-linking occurred in runs 2 and 3 as evidenced by the presence of gel. The above data illustrate the dual effect of the diisocyanate and halogen-containing compound acting together in comparison with the diisocyanate acting alone.

*Example II*

Butadiene was polymerized at 50° C. using the recipe and procedure described in Example I. After a 4-hour polymerization period, 60-millimoles of 4-dimethylaminobenzaldehyde was added and the mixture was stirred. The temperature was maintained at 50° C. for 14 hours after addition of the aldehyde. The reaction mixture was then washed three times with water and the polymer coagulated with isopropanol and recovered as in the preceding example. Titration with perchloric acid showed that the product contained 34.3 millimoles of base per 100 grams of polymer. It was gel free. Inherent viscosity prior to the aldehyde treatment was 0.24 and after treatment it was 0.23.

The dimethylaminobenzaldehyde-treated polymer was cured with bis(chloromethyl) ether alone (a quaternizing agent for the tertiary amino group) and with a mixture of bis(chloromethyl) ether and tolylene-2,4-diisocyanate (the latter a curative for the hydroxy group), using one equivalent of reactant per end group with which it would react. One run was made in which the polymer was heated at the curing temperature but no curative was added. The following results were obtained:

| Run No. | Curing Agent | Curing Temp., °F. | Time, Days | Inh. Vis. | Gel, Percent |
|---|---|---|---|---|---|
| 1 | None | 160 | 5 | 0.29 | 0 |
| 2 | (ClCH$_2$)$_2$O | 160 | 5 | [1] 0.37 | 38 |
| 3 | (ClCH$_2$)$_2$O+tolylene-2,4-diisocyanate. | 160 | 5 | [1] 0.52 | 63 |

[1] On soluble polymer.

The data show that crosslinking occurred with bis(chloromethyl) ether alone, as evidenced by the gel content. An additional amount of crosslinking occurred when a mixture of curing agents was used, as shown by a greater amount of gel than was formed in run 2.

*Example III*

Liquid polybutadiene was prepared as in Example I using a 20 millimole initiator level and 860 parts of toluene instead of cyclohexane. After a 20-minute polymerization period, 40 millimoles of dimethylaminopivalaldehyde was added with stirring. The mixture was allowed to stand overnight at room temperature, washed 8 times with water, and the solvent was removed in a rotating drier under vacuum. The product had an inherent viscosity of 0.17 and was gel free.

Samples of the polymer were cured with tolylene-2,4-diisocyanate and with bis(chloromethyl) ether, using one equivalent of reactant per end group with which it will react. The following results were obtained.

| | Curing Agent | |
|---|---|---|
| | Tolylene-2,4-diisocyanate | Bis(chloromethyl) Ether |
| Curing temperature, °C | 60–70 | 60–70. |
| Curing time | 20 hours | 3 days. |
| Tensile, p.s.i. | 150 | 93. |
| Elongation, percent | 210 | 510. |
| Gel, percent | 95 | not determined. |

The liquid polymer was cured to a solid product with each curative. The results indicate that both hydroxy and tert-amino groups were present.

*Example IV*

The recipe of Example I was employed for the polymerization of butadiene using initiator levels of 5, 10 and 20 millimoles. Polymerizations were effected at 50° C. for 4 hours after which a 0.25 molar dispersion of Michler's ketone [4,4'-bis(dimethylamino)benzophenone] in toluene was added with stirring to each run. The reactions were allowed to continue 14 hours at 50° C. after which the mixtures were each washed with three 100-milliliter portions of water. The polymers were coagulated with isopropanol, separated, and dried. The millimoles of base per 100 grams of polymer was determined on each polymer by titration of a benzene solution with perchloric acid in glacial acetic acid. Results of the titrations as well as inherent viscosity and gel determinations and also curing runs are shown below:

| | Initiator level, Millimoles | | |
|---|---|---|---|
| | 5 | 10 | 20 |
| Michler's ketone, millimoles | 15 | 30 | 60 |
| Mmoles base per 100 g. polymer | 16.8 | 27.8 | 39.5 |
| Inherent viscosity | 0.56 | not det'd | 0.29 |
| Gel, percent | 0 | not det'd | 0 |
| Curing runs (3 days at 160° F.): | | | |
| No curative— | | | |
| Inherent viscosity | 0.63 | 0.51 | 0.31 |
| Gel, percent | 0 | 0 | 0 |
| Bis(chloromethyl) ether [1]— | | | |
| Gel, percent | 91 | 92 | 90 |
| Tolylene-2,4-diisocyanate [1]— | | | |
| Gel, percent | 21 | | |

[1] One equivalent of curative was used per end group with which it would react.

The above data illustrate the effect of initiator level on the ultimate reactivity of the polymer after reaction with 4,4'-bis(dimethylamino)benzophenone. At the higher initiator levels the molecular weight of the polymer is lower so that more reactive groups are present at the ends of the polymer molecules. The data illustrate that these polymers are crosslinked quite effectively with bis(chloromethyl)ether and also that crosslinking occurs when the polymers are reacted with tolylene-2,4-diisocyanate.

*Example V*

The copolymerization of butadiene and styrene was effected in accordance with the following recipe:

| | |
|---|---|
| Cyclohexane, parts by weight | 1170 |
| 1,3-butadiene, parts by weight | 77 |
| Styrene, parts by weight | 23 |
| 1,2-dilithio-1,2-diphenylethane, mmoles | 1.2 or 1.3 |
| Tetrahydrofuran, parts by weight | 1.5 |
| Temperature, °C | 50 |
| Time, hours | 2 |

Runs were made at both initiator levels. After a 2-hour polymerization period, 3.0 millimoles of 4-dimethylaminobenzaldehyde was added (as an 0.5 molar solution in toluene) to each mixture, with stirring, and the reactions were allowed to continue for 14 more hours at 50° C. The mixtures were washed with water and the polymers were coagulated with isopropanol, separated, and dried. The Mooney values (ML–4 at 212° F.) of the rubbery polymers prepared at both initiator levels, before and after dimethylaminobenzaldehyde treatment, are shown below:

| | Initiator level, Millimoles | |
|---|---|---|
| | 1.2 | 1.3 |
| ML–4 of original polymer | 60.7 | 35.3 |
| ML–4 after aldehyde treatment | 63.3 | 35.1 |

The aldehyde-treated polymers from both runs were blended and the blend compounded in accordance with the following formulations and cured 30 minutes at 307° F.:

| | Parts by Weight | |
|---|---|---|
| | 1 | 2 |
| Aldehyde-treated polymer | 100 | 100 |
| High abrasion furnace black (Philblack O) | 50 | 50 |
| Dicumyl peroxide | 0.32 | 0.32 |
| Hexachloro-p-xylene | | 0.5 |
| Tolylene-2,4-diisocyanate | | 0.5 |

PROPERTIES OF CURED STOCKS

| | | |
|---|---|---|
| $V_r$ [1] | 0.383 | 0.442 |
| Tensile, p.s.i. | 2,690 | 2,680 |
| Elongation, percent | 440 | 280 |
| ΔT, °F | 72.3 | 50.3 |
| Resilience, percent | 72.3 | 75.4 |
| Shore hardness | 67 | 71 |

[1] Volume fraction of polymer in the swollen stock determined according to the method described in Rubber World, 135, No. 1, 67–73 (1956). This is an indication of the degree of crosslinking in the polymer.

The $V_r$ data show that a much tighter cure was obtained when curing involved the terminal groups as well as crosslinking along the polymer chain (dicumyl peroxide cure). The heat build-up and resilience properties were better on the stock in which the terminal groups were included in the curing.

*Example VI*

The recipe of Example III was employed for the production of liquid polybutadiene and 20 millimoles of 1,2-dilithio-1,2-diphenylethane was used as the initiator.

Polymerization was carried out at 50° C. for one hour after which 44 millimoles of dimethylaminopivalaldehyde was added. The product was recovered as in preceding runs by washing with water, coagulating with isopropanol, and drying. A benzene solution of a sample of the aldehyde-treated polymer was titrated with perchloric acid in glacial acetic acid. Results showed that 29.6 millimoles of base was present per 100 grams of polymer.

One hundred parts by weight of the aldehyde-treated liquid polymer was heated with 9 parts by weight of naphthalene-1,5-diisocyanate for 2 hours at 120 C. after which 1.4 parts by weight of 1,4-butanediol was added as a chain extender. The mixture then heated for 16 hours at 110° C., milled on a roll mill at room temperature, 3.5 parts by weight of naphthalene-1,5-diisocyanate was added on the mill, and the composition was finally heated one hour at 120° C. It had a tensile strength of 110 p.s.i. and an elongation of 270 percent. After a post-curing period of 48 hours at room temperature, the tensile strength had increased to 530 p.s.i. and the elongation was 300 percent.

*Example VII*

The dimethylaminopivalaldehyde-treated polymer of Example VI was compounded in accordance with the following recipe:

|  | Parts by weight |
|---|---|
| Polymer | 100 |
| Philblack A¹ | 40 |
| Naphthalene-1,5-diisocyanate | 9 |
| 1,4-butanediol | 1.4 |

¹ Fast extruding furnace black.

A mixture of the polymer and carbon black was heated two hours at 110° C., the naphthalene-1,5-diisocyanate was added and the mixture was stirred 5 minutes before adding the butanediol. The composition was then heated 16 hours at 110° C., milled on a roll mill at room temperature, and 3.5 parts of naphthalene-1,5-diisocyanate was incorporated on the mill. After curing one hour at 250° F. (121° C.) and a post cure at room temperature for 48 hours, the product had a tensile strength of 1050 p.s.i. and an elongation of 130 percent.

*Example VIII*

Liquid polybutadiene containing terminal hydroxy groups was prepared in accordance with the following recipe:

| Toluene, parts by weight | 1200 |
|---|---|
| 1,3-butadiene | 100 |
| 1,2-dilithio-1,2-diphenylethane, moles | 25 |
| Temperature, ° C | 50 |
| Time, hours | 2 |

Toluene was charged to the reactor after which it was purged with nitrogen, butadiene was introduced, and 1,2-dilithio-1,2-diphenylethane was added. After a two-hour polymerization period, 250 millimoles of ethylene oxide was added and the reaction was continued at 50° C. for another 66 hours. Dilute hydrochloric acid was added, the mixture was washed with water, and the hydroxy-containing polymer was recovered by stripping the solvent and drying in a rotary drier. The product had an inherent viscosity of 0.17 and was gel free.

Curing studies were made on the hydroxy-containing polymer and a liquid polymer containing both dimethylamino and hydroxy groups prepared as in Example VI. One hundred parts by weight of each polymer was heated with 9 parts by weight of naphthalene-1,5-diisocyanate and 1.4 parts by weight of 1,4-butanediol for 16 hours at 110° C. The compositions were then milled on a roll mill at room temperature, 3.5 parts by weight of naphthalene-1,5-diisocyanate was added on the mill, and the final curing was effected at 120° C. for 60 minutes followed by a 24-hour post cure at room temperature. Tensile strength and elongation were determined on both samples and gave the following results:

|  | Tensile, p.s.i. | Elongation, percent |
|---|---|---|
| Hydroxy-containing polymer | 65 | 150 |
| Tertiary amino-hydroxy-containing polymer | 465 | 320 |

The above data show that the hydroxy groups on the polymer ends which contain the tertiary amino groups are considerably more reactive with the diisocyanate than are the polymers containing hydroxy groups alone. Substantially improved tensile strength and elongation were exhibited by the products prepared according to our invention.

As will be apparent to those skilled in the art from the above disclosure, various modifications can be made in our invention without departing from the spirit of scope thereof.

We claim:

1. A process for making a polymeric product which comprises reacting a polymer of conjugated dienes containing 4 to 12 carbon atoms per molecule and said polymer containing at least 1 terminal alkali metal atom per molecule with a compound selected from the group consisting of N,N-disubstituted amino aldehydes and N,N-disubstituted amino ketones.

2. A process for preparing a polymeric product which comprises reacting a polymer of conjugated dienes containing 4 to 12 carbon atoms per molecule and said polymer containing at least 1 terminal lithium atom per molecule with a compound selected from the group consisting of N,N-disubstituted amino aldehydes and N,N-disubstituted amino ketones containing from 2 to 20 carbon atoms per molecule and from 1 to 4 N,N-disubstituted amino groups wherein each of the substituents of the amino groups contains from 1 to 12 carbon atoms and is selected from the group consisting of alkyl, cycloalkyl, aryl, aralkyl and alkaryl groups.

3. A process for preparing a polymeric product which comprises reacting a polymer of conjugated dienes containing 4 to 12 carbon atoms per molecule and said polymer containing at least 1 terminal lithium atom per molecule with 1 to 25 mols per gram atom of lithium of a compound selected from the group consisting of N,N-disubstituted amino aldehydes and N,N-disubstituted amino ketones containing from 2 to 20 carbon atoms per molecule and from 1 to 4 N,N-disubstituted amino groups wherein each of the substituents of the amino groups contains from 1 to 12 carbon atoms and is selected from the group consisting of alkyl, cycloalkyl, aryl, aralkyl and alkaryl groups at a temperature in the range of 0 to 150° C.

4. A process for making a polymeric product which comprises reacting a polymer of conjugated dienes containing 4 to 12 carbon atoms per molecule and said polymer containing at least 1 terminal alkali metal atom per molecule with a compound selected from the group consisting of N,N-disubstituted amino aldehydes and N,N-disubstituted amino ketones, hydrolyzing the reaction product, and curing the resulting polymer containing terminal hydroxy and tertiary amino groups in the presence of a polyfunctional coupling agent reactive with at least one of said terminal functional groups of said polymer.

5. A process for preparing a polymeric product which comprises reacting a polymer of conjugated dienes containing 4 to 12 carbon atoms per molecule and said polymer containing at least 1 terminal lithium atom per molecule with a compound selected from the group consisting of N,N-disubstituted amino aldehydes and N,N-disubstituted amino ketones containing from 2 to 20 carbon atoms per molecule and from 1 to 4 N,N-disubstituted amino groups wherein each of the substituents of the amino groups contains from 1 to 12 carbon atoms and is selected from the group consisting of alkyl, cycloalkyl, aryl, aralkyl and alkaryl groups hydrolyzing the reaction product, and reacting the resulting polymer with a polyisocyanate.

6. The process of claim 5 wherein said polymer is a butadiene polymer containing at least 2 terminal lithium atoms per molecule, said disubstituted amino compound is 4-dimethylaminobenzaldehyde and said polyisocyanate is tolylene-2,4-diisocyanate.

7. The process of claim 5 wherein said polymer is a butadiene-styrene copolymer containing at least 2 terminal lithium atoms per molecule, said disubstituted amino compound is 4-dimethylaminobenzaldehyde and said polyisocyanate is naphthalene-1,5-diisocyanate.

8. A process for preparing a polymeric product which comprises reacting a polymer of conjugated dienes containing 4 to 12 carbon atoms per molecule and said polymer containing at least 1 terminal lithium atom per molecule with a compound selected from the group consisting of N,N-disubstituted amino aldehydes and N,N-disubstituted amino ketones containing from 2 to 20 carbon atoms per molecule and from 1 to 4 N,N-disubstituted amino groups wherein each of the substituents of the amino groups contains from 1 to 12 carbon atoms and is selected from the group consisting of alkyl, cycloalkyl, aryl, aralkyl and alkaryl groups, hydrolyzing the reaction product and curing the resulting polymer containing terminal hydroxy and tertiary amino groups at a temperature in the range of 150 to 350° F. with a polyisocyanate having the formula R(NCO)$_n$ wherein $n$ is an integer of 2 to 4 and R is selected from the group consisting of aliphatic, cycloaliphatic and aromatic polyvalent organic radicals containing from 2 to 30 carbon atoms and a polyhalogen-containing compound which contains not more than 3 halogen atoms attached to a single carbon atom.

9. A process according to claim 8 wherein said polymer is polybutadiene containing 2 terminal lithium atoms per molecule, said disubstituted amino compound is 4-dimethylaminobenzaldehyde, said polyisocyanate is tolylene-2,4-diisocyanate, and said polyhalogen-containing compound is bis(chloromethyl)ether.

10. A process according to claim 8 wherein said polymer is polyisoprene having 2-terminal lithium atoms per molecule, said disubstituted amino compound is 4,4'-bis(dimethylamino)benzophenone, said polyisocyanate is tolylene-2,4-diisocyanate, and said polyhalogen-containing compound is hexachloro-p-xylene.

11. The process according to claim 8 wherein said polymer is a butadiene-styrene copolymer containing 2 terminal lithium atoms per molecule, said disubstituted amino compound is 4-dimethylaminobenzaldehyde, said polyisocyanate is tolylene-2,3-diisocyanate and said polyhalogen-containing compound is α,α'-dichloro-p-xylene.

12. A process for making a polymeric product which comprises contacting a conjugated diene containing 4 to 12 carbon atoms per molecule with a polymerization initiator having a formula R'M$_x$ wherein R' is a hydrocarbon radical selected from the group consisting of aliphatic, cycloaliphatic and aromatic radicals containing from 1 to 20 carbon atoms, M is an alkali metal and $x$ is an integer of 1 to 4 under polymerization conditions to produce a polymer containing at least 1 terminal alkali metal atom per molecule, contacting the resulting polymer with a disubstituted amino compound selected from the group consisting of N,N'-disubstituted amino aldehydes and N,N-disubstituted ketones having from 2 to 20 carbon atoms per molecule and from 1 to 4 N,N-disubstituted amino groups wherein each substituent in the amino groups constains from 1 to 12 carbon atoms and is selected from the group consisting of alkyl, cycloalkyl, aryl, alkaryl and aralkyl groups, hydrolyzing the reaction product, and curing the resulting polymer containing terminal hydroxy and tertiary amino groups with a polyisocyanate having the formula R(NCO)$_n$ wherein R is selected from the group consisting of aliphatic, cycloaliphatic, and aromatic polyvalent organic radicals containing from 2 to 30 carbon atoms and $n$ is an integer of 2 to 4 and a polyhalogen-containing compound wherein not more than 3 halogen atoms are attached to a single carbon atom.

13. A process according to claim 12 wherein said conjugated diene is butadiene, said organo alkali metal compound is 1,2-dilithio-1,2-diphenylethane, said disubstituted amino compound is 4-dimethylaminobenzaldehyde, said polyisocyanate is tolylene-2,4-diisocyanate, and said polyhalogen-containing compound is bis(chloromethyl) ether.

14. A polymeric product prepared according to the method of claim 1.

15. A polymeric product prepared according to the method of claim 5.

16. A polymeric product prepared according to the method of claim 8.

17. A cured butadiene polymeric composition prepared according to the method of claim 9.

References Cited in the file of this patent
UNITED STATES PATENTS

| | | |
|---|---|---|
| 2,146,447 | Scott | Feb. 7, 1939 |
| 2,731,454 | Edmonds | Jan. 17, 1956 |
| 2,877,212 | Seligmann | Mar. 10, 1959 |